United States Patent
Pelissier

(10) Patent No.: US 9,434,465 B2
(45) Date of Patent: Sep. 6, 2016

(54) BODY PANEL FOR A TRANSPORT VEHICLE INCLUDING A HEAT-EXCHANGE DEVICE AND TRANSPORT VEHICLE INCLUDING SUCH A BODY PANEL

(71) Applicant: LIEBHERR-AEROSPACE TOULOUSE SAS, Toulouse (FR)

(72) Inventor: Bertrand Pelissier, Saint Alban (FR)

(73) Assignee: LIEBHERR-AEROSPACE TOULOUSE SAS, Toulouse (FR)

( * ) Notice: Subject to any disclaimer, the term of this patent is extended or adjusted under 35 U.S.C. 154(b) by 34 days.

(21) Appl. No.: 14/429,002

(22) PCT Filed: Sep. 19, 2013

(86) PCT No.: PCT/FR2013/052170
§ 371 (c)(1),
(2) Date: Mar. 18, 2015

(87) PCT Pub. No.: WO2014/044981
PCT Pub. Date: Mar. 27, 2014

(65) Prior Publication Data
US 2015/0246719 A1 Sep. 3, 2015

(30) Foreign Application Priority Data
Sep. 19, 2012 (FR) .................... 12 58791

(51) Int. Cl.
*B64C 1/40* (2006.01)
*B64C 1/12* (2006.01)
*B64D 13/00* (2006.01)
*B64C 1/06* (2006.01)

(52) U.S. Cl.
CPC ............... *B64C 1/40* (2013.01); *B64C 1/068* (2013.01); *B64C 1/12* (2013.01); *B64D 13/006* (2013.01); *Y02T 50/44* (2013.01); *Y02T 50/56* (2013.01)

(58) Field of Classification Search
CPC ........... B64C 1/40; B64C 1/068; B64C 1/12; B64C 13/006
See application file for complete search history.

(56) References Cited

U.S. PATENT DOCUMENTS

| | | | | |
|---|---|---|---|---|
| 2,452,251 A | * | 10/1948 | Martin | B64C 25/16 244/102 R |
| 4,819,720 A | * | 4/1989 | Howard | B64D 13/00 165/104.34 |
| 5,702,073 A | * | 12/1997 | Fluegel | B64C 1/38 165/171 |

(Continued)

FOREIGN PATENT DOCUMENTS

| | | |
|---|---|---|
| FR | 2 835 313 A | 8/2003 |
| JP | H03 25096 A | 2/1991 |

(Continued)

OTHER PUBLICATIONS

International Search Report, dated Dec. 11, 2013, from corresponding PCT application.

*Primary Examiner* — Justin Benedik
(74) *Attorney, Agent, or Firm* — Young & Thompson

(57) ABSTRACT

A body panel (1) for a transport vehicle—in particular for an aircraft—includes a supporting plate (2) and a heat-exchange device (6), the supporting plate forming (2) on the outer face (4) thereof facing the exchanger (6) an indentation (10) extending in the body of the supporting plate (2) holding the heat-exchange device (6) such that the heat-exchange device (6) does not extend beyond the general profile of the body of the transport vehicle.

19 Claims, 5 Drawing Sheets

(56) References Cited

U.S. PATENT DOCUMENTS

Figure 1:
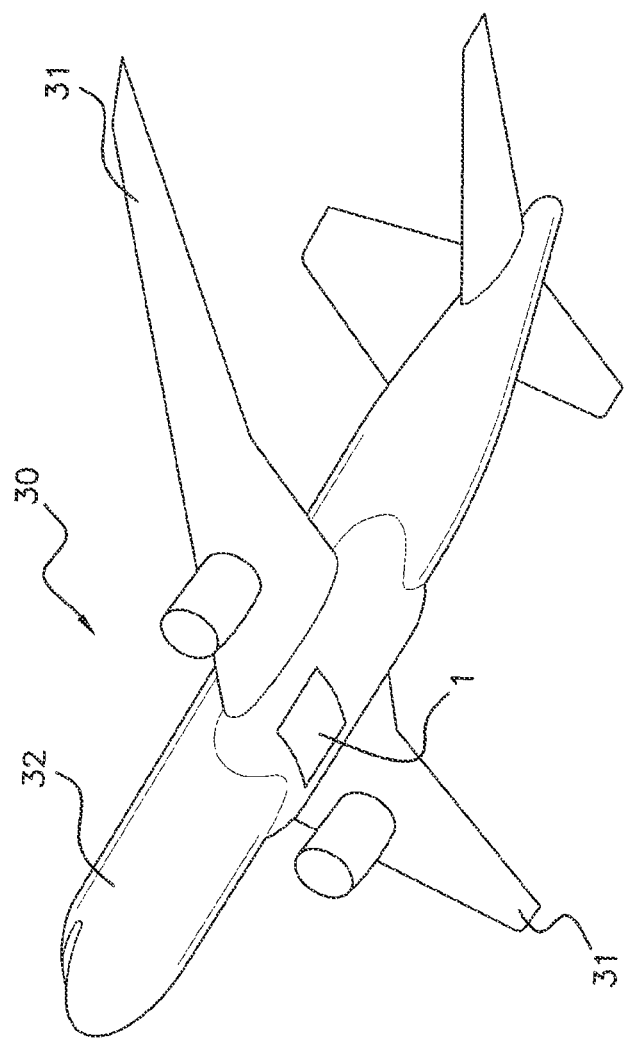

| | | | |
|---|---|---|---|
| 6,042,315 A * | 3/2000 | Miller | F16B 19/00 411/383 |
| 2003/0116678 A1* | 6/2003 | Gardner | B64C 1/40 244/117 A |
| 2003/0141043 A1* | 7/2003 | Warburton | F23R 3/007 165/80.4 |
| 2006/0065784 A1* | 3/2006 | Rouyre | B64D 29/06 244/119 |
| 2008/0099610 A1* | 5/2008 | Jimenez Del Lago | B64C 1/26 244/119 |
| 2008/0283665 A1* | 11/2008 | Rouyre | B64C 1/26 244/119 |

FOREIGN PATENT DOCUMENTS

| | | |
|---|---|---|
| WO | 2008/140972 A1 | 11/2008 |
| WO | 2009146843 A1 | 12/2009 |

* cited by examiner

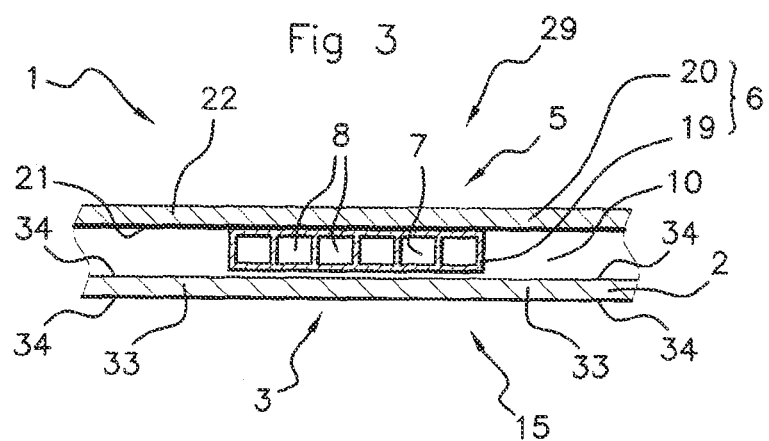
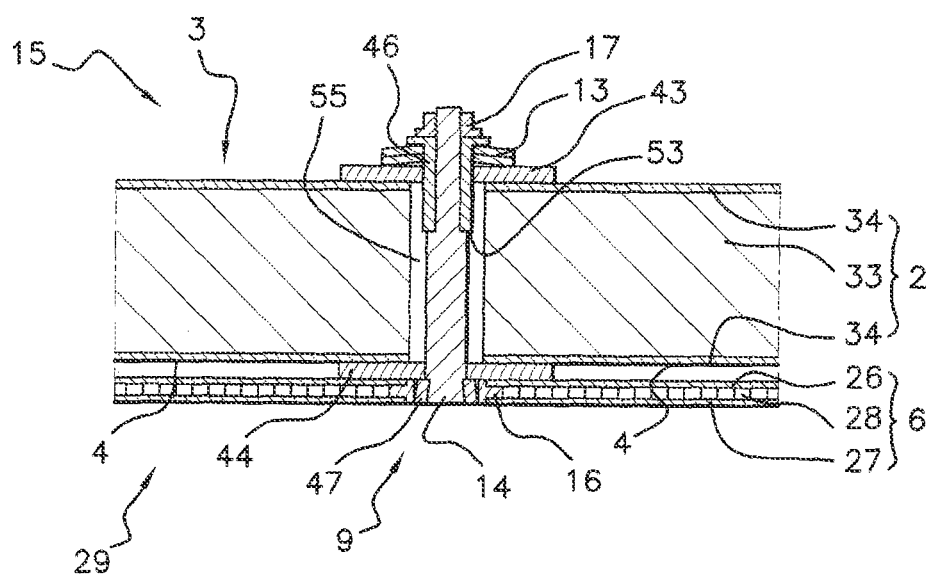
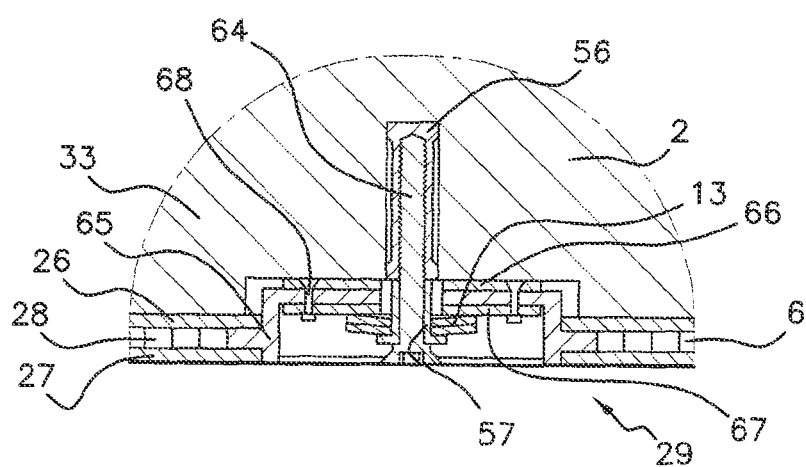

BODY PANEL FOR A TRANSPORT VEHICLE INCLUDING A HEAT-EXCHANGE DEVICE AND TRANSPORT VEHICLE INCLUDING SUCH A BODY PANEL

The invention relates to a body panel for a transport vehicle—especially a fuselage panel for an aircraft—comprising a heat exchange device. The invention is aimed in general at a transport vehicle comprising such a body panel. The invention relates in particular to an aircraft comprising such a fuselage panel. The invention relates in particular to a fuselage panel for an aircraft comprising a fuselage in which each panel of said fuselage forming the skin of the aircraft is connected securely to at least one frame, at least one longeron and/or at least one stringer of the primary structure of the aircraft.

Such a body panel—especially a fuselage panel for an aircraft—comprising a heat exchange device finds applications in the field of the construction and maintenance of transport vehicles, in particular in the field of aircraft construction and maintenance in which there are more particularly sought heat exchange solutions which are efficient and do not disturb the aerodynamics of the aircraft, in particular of an aeroplane or a helicopter. However, such a body panel also finds applications in the construction and equipment of any other means of transport, in particular means of transport by rail, means of transport by road and means of transport by sea.

Such a body panel—especially a fuselage panel for an aircraft—comprising a heat exchange device is in particular sought for purposes of being able to cool by heat exchange the equipment installed on board the transport vehicle and producing the heat inside the transport vehicle.

A heat exchange device comprising a heat exchange tube mounted facing the inner face of the outer skin of an aircraft is already known from U.S. Pat. No. 5,702,073. Such a device has an arcuate spacer extending between the heat exchange tube and the skin of the aircraft and is secured to the heat exchange tube. In such a device, the heat exchange tube is fastened securely to the frames and stringers of the primary structure of the aircraft.

Such a heat exchange device of an aircraft is installed from inside the aircraft. It is not in contact with the cold air outside the aircraft and therefore has a limited heat exchange efficiency. Nor does it allow easy installation of the heat exchanger during the fitting of the fuselage panel of the aircraft.

WO 2008/140972 describes a device for dissipating the heat produced by electrical elements of an aircraft. Such a device comprises a tube for circulation of a fluid extending in the thickness of the skin of the wing or fuselage of the aircraft, said circulation tube being enclosed in a heat-conducting material such as a carbon foam. Such a heat dissipation device is complex in its installation. It requires the use of a heat-conducting material for enclosing the circulation tube. In such a device, the outer face of the wall of the tube for circulation of the heat exchange fluid does not extend directly in contact with the outside air. Such an exchanger is therefore of low efficiency.

WO 2009/146843 describes a device for cooling a hot member in an aircraft, said device comprising a circuit for circulation of a heat transfer fluid in fluid communication with the hot member so as to be able to extract the heat released by the hot member and exchange this heat with a heat exchange device extending in the thickness of an inner layer of the aircraft fuselage. In particular, the inner layer of the fuselage incorporating the heat exchange device is shaped to follow the inner contour of the fuselage by which the heat exchange device is coupled by heat exchange to the external environment.

The invention is therefore aimed at a body panel for a transport vehicle—especially a fuselage panel for an aircraft—comprising a heat exchange device which allows dissipation to the outside of the transport vehicle of at least part of the heat released by equipment—especially electrical and/or electronic equipment—of the transport vehicle.

The invention is therefore aimed at a body panel for a transport vehicle—especially a fuselage panel for an aircraft—comprising a heat exchange device adapted to be able to cool the liquid loops of the transport vehicle—especially of an aircraft—.

The invention is aimed in particular at such a fuselage panel for an aircraft comprising a heat exchange device adapted to allow an improved heat exchange and to nevertheless preserve the general profile of the fuselage and not increase the drag of the latter.

Thus, the invention is aimed at such a fuselage panel for an aircraft comprising a heat exchange device adapted to not cause a lowering of the load of the aircraft and to not reduce the efficiency of the aircraft.

The invention is aimed at such a fuselage panel for an aircraft comprising a heat exchange device of great efficiency, especially when the aircraft is in flight and when the temperature difference between the external environment and the internal environment of the aircraft is large—especially several tens of degrees—and more particularly when the aircraft is on the ground and the temperature difference between the external environment and the internal environment of the aircraft is small.

The invention is aimed at such a fuselage panel for an aircraft comprising a heat exchange device of great efficiency when the aircraft is in flight conditions and the outside air exerts a dynamic flow in contact with the heat exchange device.

The invention is aimed at such a fuselage panel for an aircraft comprising a heat exchange device of great efficiency adapted to allow a dissipation of the heat released by on-board equipment by natural convection even when the aircraft is taxiing.

The invention is aimed at such a fuselage panel for an aircraft comprising a heat exchange device adapted to allow a dissipation of the heat released by on-board equipment by forced convection when the aircraft is in flight.

The invention is aimed at such body panel for a transport vehicle—especially a fuselage panel for an aircraft—comprising a heat exchange device capable of replacing a body element of said transport vehicle, especially a fuselage panel of an aircraft of the semi-monocoque type, in particular of replacing a fuselage panel of an aircraft extending to the junction of the wing (named the belly fairing) of said aircraft of the semi-monocoque type.

The invention is aimed at such a body panel for a transport vehicle—especially a fuselage panel for an aircraft—comprising a heat exchange device and having a mechanical strength adapted for a use on a transport vehicle moving in the air.

The invention is aimed at such a body panel for a transport vehicle—especially a fuselage panel for an aircraft—comprising a heat exchange device which is accessible from outside the transport vehicle and for which the maintenance is facilitated.

The invention aims to overcome the above-mentioned disadvantages by providing a body panel for a transport vehicle—especially a fuselage panel for an aircraft—comprising a heat exchange device of improved efficiency.

The invention also aims to achieve all these objectives at lower cost, by proposing such a body panel for a transport vehicle—especially a fuselage panel for an aircraft—comprising a heat exchange device which is of low cost.

The invention also aims to propose such a body panel for a transport vehicle—especially a fuselage panel for an aircraft—comprising a heat exchange device which is compatible with the safety constraints, with the regulation constraints—especially aeronautical—and with the constraints of reduced fuel consumption of the transport vehicle.

The invention aims moreover to propose such a solution which preserves the work habits of the personnel, especially of the maintenance personnel.

To this end, the invention relates to a body panel for a transport vehicle—especially for an aircraft—comprising a heat exchange device, said body panel having a smaller dimension, named the thickness, extending in a first direction, named the radial direction, and two larger dimensions extending in two directions perpendicular to one another and perpendicular to the radial direction, said panel comprising a supporting plate having a first main face, named the inner face, intended to be in contact with an internal space of the transport vehicle and a second face, named the outer face, opposite said inner face;
the heat exchange device is fastened to the supporting plate by a fastening device and extends on said outer face of the supporting plate and so as to extend in contact with an external environment of the transport vehicle, said heat exchange device being shaped to allow a circulation of a heat transfer fluid in a heat transfer fluid circuit comprising the heat exchange device between at least one heat transfer fluid inlet of the heat exchange device and at least one heat transfer fluid outlet of the heat exchange device and to allow a dissipation of heat of the heat transfer fluid to the external environment of the transport vehicle;
wherein the supporting plate forms, on its outer face, an indentation extending in the thickness of the supporting plate, said indentation being adapted to receive the heat exchange device and so that the heat exchange device does not extend beyond the general profile of the body of the transport vehicle.

The invention thus relates to a body panel for a transport vehicle—especially a fuselage panel for an aircraft—, said transport vehicle being able to move and cause a flow of air at the surface of its body—especially of its fuselage—when it is moving. The transport vehicle body panel according to the invention comprises a supporting plate and a heat exchange device distinct from said supporting plate and adapted to be able to be directly in contact with the external environment of the transport vehicle. The body panel comprising the heat exchange device according to the invention is thus adapted to be able to replace a body panel—especially an aircraft fuselage panel—of the prior art. Such a body panel for a transport vehicle—especially such a fuselage panel for an aircraft—comprising an external heat exchange device makes it possible to ensure the cooling function of a heat transfer fluid while maintaining the aerodynamic behaviour of the transport vehicle—especially the aircraft. The invention is in particular advantageous from this point of view compared with the installation of an air intake recessed into an aircraft fuselage.

Advantageously and according to the invention, the heat exchange device is supported by the supporting plate. The heat exchange device is connected to the supporting plate and is not supported directly by a primary structure (for example framework) of the transport vehicle. The fuselage panel thus allows easier mounting, demounting and maintenance of the heat exchange device. Advantageously and according to the invention, the heat exchange device extends outside the pressurised space of the aircraft.

Advantageously and according to the invention, the panel has a main face extending in contact with the external environment of the aircraft of rounded convex shape and having in section in at least one radial plane—especially in each of the radial planes—comprising the radial direction of the fuselage panel a curvature adapted to preserve the aerodynamic behaviour of the aircraft.

Advantageously, an aircraft fuselage panel according to the invention is adapted to follow the general profile of the fuselage and not to change the aerodynamic behaviour of the aircraft. In particular, the fuselage panel comprising the heat exchange device has, in section in at least one radial plane—especially in each of the radial planes—comprising the radial direction of the fuselage panel for an aircraft, a curvature inscribed in the general curvature of the fuselage of the aircraft.

The supporting plate—for example made of rigid composite material—has a shape obtained by moulding adapted to receive the heat exchange device and to hold the latter so as to keep the general aerodynamic profile of the aircraft.

Advantageously and according to the invention, the fastening device for fastening the heat exchange device to the supporting plate comprises fastening ties distributed at the surface of the heat exchange device and holding the heat exchange device rigidly with respect to the supporting plate.

Advantageously and according to the invention, each fastening tie comprises:
   a tangential clearance allowing relative movements of the heat exchange device with respect to the supporting plate in a tangential direction perpendicular to said radial direction,
   a radial clamping device applying at least one tangential face secured to the heat exchange device and at least one tangential face secured to the supporting plate to bear on one another with a prestress in compression chosen so as to produce a static friction of the heat exchange device on the supporting plate:
      sufficient to keep in operation (in the conditions of use of the transport vehicle) the heat exchange device fixed with respect to the supporting plate,
      allowing the tangential relative movements of the heat exchange device with respect to the supporting plate by virtue of the tangential clearance under the effect of the differential thermal expansions between the heat exchange device and the supporting plate.

In particular, the invention solves the technical problems relating to:
   the relative movements of the heat exchange device with respect to the structural elements of the aircraft—especially the movements and deformations of the heat exchange device made of aluminium due to its differential thermal expansion on exposure to a temperature different from the temperature of the structural elements of the aircraft;
   the fastening and keeping in shape of the heat exchange device subjected to the aerodynamic forces of the vehicle—especially of the aircraft—or to the differential thermal expansion of the heat exchange plate.

Unexpectedly, it turns out that it is possible to design the heat exchange device and its fastening device in such a manner that the tangential forces generated by thermal expansion of the heat exchange device have a value greater than the tangential forces to which the heat exchange device is subjected in operation (especially in flight conditions) and that there exists a tangential force threshold value less than that causing a buckling of the heat exchange device minus a sufficient safety margin and greater than the tangential forces to which the heat exchange device is subjected in flight condition, below which the heat exchange device remains fixed with respect to the supporting plate and above which the heat exchange device moves with respect to the supporting plate to reduce the stresses generated by the expansion of the heat exchange device.

The device for fastening the heat exchange device to the supporting plate is thus adapted to allow certain controlled radial relative movements between the structural elements of the aircraft and the heat exchange device.

The fastening ties are adapted to allow a relative movement between the heat exchange device and the supporting plate at each fastening tie and to control the static friction between the heat exchange device and the supporting plate. In particular, the fastening ties are adapted to allow such a relative movement of the heat exchange device and of the supporting plate under the effect of the differential expansions of the heat exchange device and of the supporting plate, especially when the heat exchange device is exposed to low temperature in the flight conditions of an aircraft.

Advantageously and according to the invention, the radial clamping device of each fastening tie is an elastic clamping device applying said tangential faces to bear on one another with an elastic prestress in compression (the value of which depends on the elastic return force exerted by this elastic clamping device), which may be adjusted by the stiffness and/or by an initial deformation imposed on this elastic clamping device.

Advantageously and according to the invention, the radial clamping device is adapted to clamp two tangential faces secured to the heat exchange device, one on each side of the supporting plate, on two tangential faces of a metal insert passing through the thickness of the supporting plate and fastened to the latter. Advantageously and according to the invention, each tangential face secured to the heat exchange device is formed of a friction washer secured tangentially to the clamping bolt.

Advantageously and according to the invention, the radial clamping device comprises a clamping bolt comprising at least one clamping nut bearing on at least one member for elastic return in axial compression such as a Belleville washer, a stack of such washers—especially mounted in opposite directions or in series—, a washer or a stack of washers made of elastomer, a helical compression spring.

Advantageously and according to the invention, said clamping bolt passes through a through hole of the supporting plate—especially formed by a through bore of said insert—while providing said tangential clearance, the latter being formed between said clamping bolt and inner walls of the hole.

Advantageously and according to the invention, the clamping bolt is an anchor having a flared head passing through an eyelet of the heat exchange device and adapted to apply the heat exchange device against the outer face of the supporting plate under the effect of said bolt and of the clamping nut. Advantageously and according to the invention, this anchor comprises said clamping nut on the side of said inner face and said member for elastic return in axial compression bearing on the side of the inner face of the supporting plate with a deformation in compression predetermined to exert said prestress in compression. Advantageously and according to the invention, the member for elastic return in axial compression bears on a friction washer secured to the anchor tangentially and itself bearing on a metal insert of the inner face of the supporting plate. Similarly, a friction washer is preferably interposed between the eyelet of the heat exchange device and the tangential face of the insert of the supporting plate.

Advantageously and according to the invention, the fastening device comprises at least one elastic clamping tie formed of a cable tensioned in traction between the heat exchange device and the supporting plate so as to apply the tangential faces of the heat exchange device and of the supporting plate to bear on one another with an elastic prestress in compression (the value of which depends on the elastic return force exerted by the cable tensioned in traction). The bending flexibility of the cable is adapted to allow the tangential relative movement of the heat exchange device on the supporting plate. Its tension and its longitudinal elasticity in traction guarantee the permanent contact of the heat exchange device and the supporting plate and the application of an elastic prestress in compression with a value predetermined and adapted to produce a static friction of the heat exchange device on the supporting plate.

Advantageously and according to the invention, the supporting plate is formed of a composite material comprising a honeycomb core extending between two rigid skins. Advantageously, the rigid skins are formed of a composite material formed of a matrix—especially of an epoxy resin matrix—and of glass fibres dispersed in said matrix. The supporting plate is thus formed of a rigid composite material adapted to be able to form the indentation suitable for receiving the heat exchange device.

Advantageously and according to the invention, the supporting plate comprises at least one fastening member, preferably demountable—especially by screws and nuts—for fastening the supporting plate to a primary structure of the transport vehicle—especially to a framework, to a frame, to a longeron or to a stringer of the aircraft. Advantageously, the fastening device for fastening the heat exchange device to the supporting plate, as well as the fastening member for fastening the supporting plate to the primary structure—especially the longerons and the stringers of the aircraft—are adapted to withstand the mechanical forces applied to the heat exchange device in operation—especially in the flight conditions of the aircraft.

Advantageously and according to the invention, the supporting plate has at least one orifice for the passage of at least one conduit of the heat transfer fluid circuit through the supporting plate, said conduit being adapted to be able to put in fluid communication the heat transfer fluid inlet and the heat transfer fluid outlet of the heat exchange device with the heat transfer fluid circuit.

Advantageously, the orifice(s) for the passage of the conduit(s) through the supporting plate of the fuselage of the aircraft is(are) situated in an unpressurised area of the aircraft. Such orifice(s) for the passage of the conduit(s) thus does(do) not require sealing of the orifice(s) for the passage of the conduit(s) between the inner face and the outer face of the supporting plate.

The inventors have observed that the heat exchange device can be especially made of aluminium while being adapted to be able to withstand the mechanical stresses to which an aircraft is subjected in flight. The invention makes it possible to obtain a highly efficient heat exchanger which has a mechanical resistance to the stresses which is sufficient and at the same time a reduced weight adapted so as not to cause a lowering of the load of the aircraft and not reduce its efficiency.

Advantageously, in a first variant of a panel according to the invention, the heat exchange device comprises:
- at least one channel in heat transfer fluid communication with the heat transfer fluid circuit of the aircraft and extending between the fluid inlet and the fluid outlet, each channel having a polygonal shape in transverse cross-section—especially a rectangular shape—and;
- a heat-conducting plate extending secured and in contact with the channel(s) on a first main face and in contact with the external environment of the aircraft on a second main face opposite said first main face.

Advantageously and according to this first variant of a device according to the invention, the heat-conducting plate is formed of a material chosen from the group formed of aluminium alloys.

Advantageously and according to this first variant of a device according to the invention, the heat-conducting plate is secured to longitudinal walls of the channel(s) by brazing.

Advantageously, in a second variant of a fuselage panel according to the invention, the heat exchange device comprises:
- a corrugated metal plate, named the inner metal plate, adapted to be able to extend facing the outer face of the supporting plate, and;
- a substantially plane outer metal plate adapted to be able to extend in contact with the external environment of the aircraft;
- said inner and outer metal plates being connected to one another by brazing so as to form a plurality of channels in heat transfer fluid communication with the heat transfer fluid circuit of the aircraft and extending between the fluid inlet and the fluid outlet.

In this variant, the heat exchange device is formed of two rigid plates welded to one another along parallel and equidistant weld lines, and forming channels for the flow of the heat transfer fluid between the fluid inlet and the fluid outlet of the heat exchange device.

Advantageously, in a third variant of a fuselage panel according to the invention, the heat exchange device comprises:
- a first metal plate adapted to be able to extend facing the outer face of the supporting plate;
- a second metal plate, and;
- extending secured between the first metal plate and the second metal plate, an interlay part adapted to be able to keep the first metal plate and the second metal plate spaced with respect to one another and to allow a circulation of the heat transfer fluid between the heat transfer fluid inlet and the heat transfer fluid outlet.

The invention further extends to a transport vehicle—especially an aircraft—comprising a panel according to the invention.

The invention also relates to a body panel for a transport vehicle and a transport vehicle comprising such a body panel characterised in combination by all or part of the features mentioned above and below.

Figure 2:
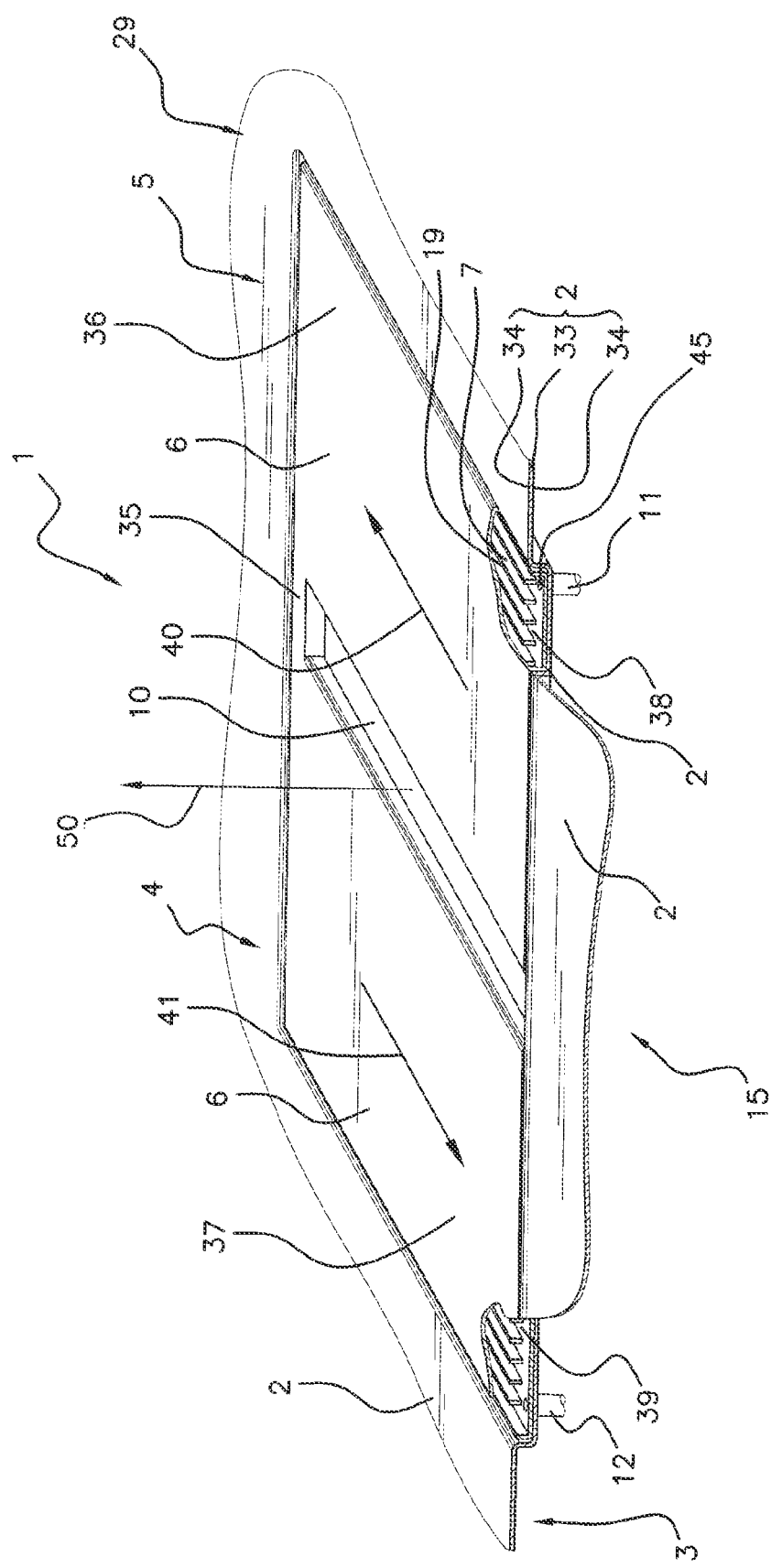
Figure 6:
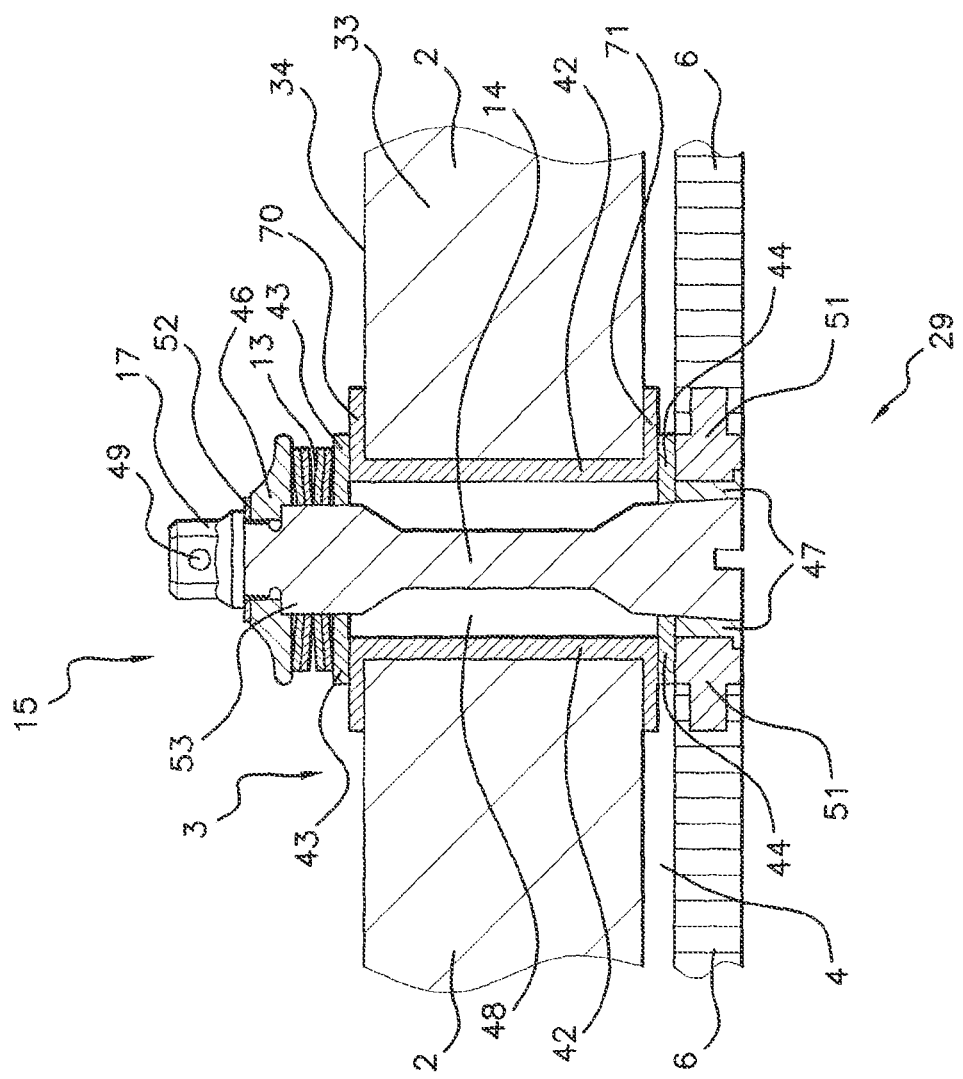
Figure 7:
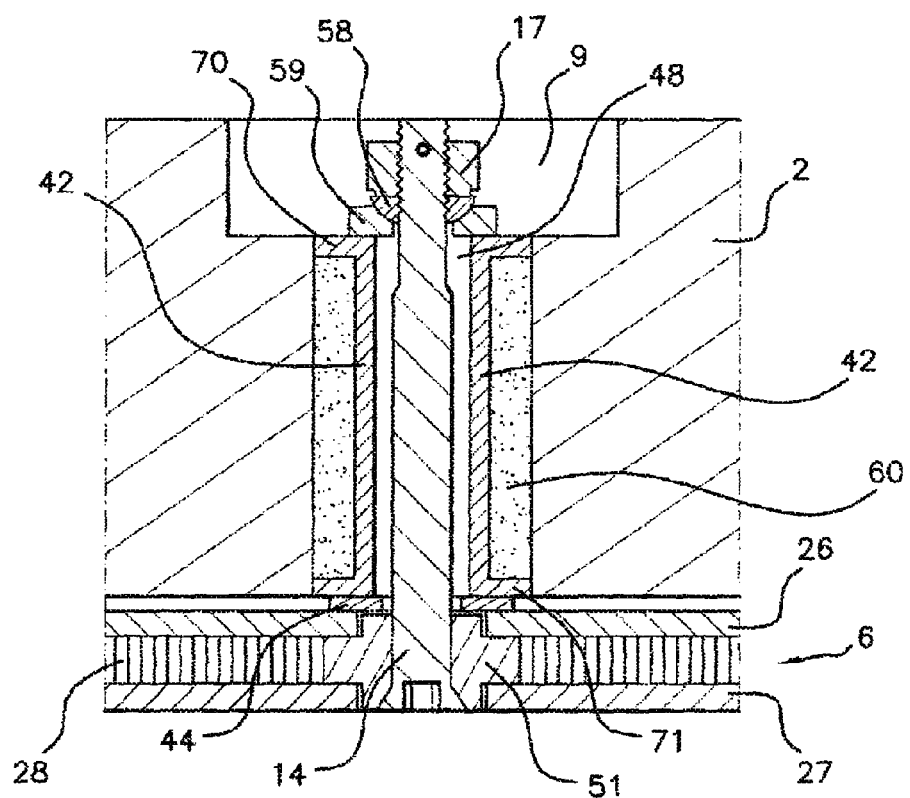

Other objects, features and advantages of the invention will become apparent on reading the following description which refers to the accompanying figures showing preferred embodiments of the invention, given solely by way of nonlimiting examples, and in which:

FIG. 1 is a perspective view of a fuselage panel according to the invention, positioned on the belly fairing of an aircraft, FIG. 2 is a cross-sectional and perspective view of a body panel according to the invention, FIG. 3 is a detail of a sectional view of a variant of a heat exchange device of a body panel according to the invention, FIG. 4 in a sectional view of a detail of a first embodiment of a fastening tie for fastening a heat exchange device to a supporting plate of a body panel according to the invention, FIG. 5 in a sectional view of a detail of a second embodiment of a fastening tie for fastening a heat exchange device to a supporting plate of a body panel according to the invention, FIG. 6 in a sectional view of a detail of a third embodiment of a fastening tie for fastening a heat exchange device to a supporting plate of a body panel according to the invention, and;

FIG. 7 in a sectional view of a detail of a fourth embodiment of a fastening tie for fastening a heat exchange device to a supporting plate of a body panel according to the invention.

An aircraft 30 shown in FIG. 1 in a flight situation has a fuselage 32 in contact with the external environment. Such an aircraft 30 has, by way of example, a body panel 1, named a fuselage panel 1, according to the invention forming a lower part of the fuselage 32 extending between the wings 31, also referred to as the belly fairing of the aircraft 30. However, such a fuselage panel 1 may be positioned in place of any other fuselage panel 1 of the aircraft 30. Of course, preferably, the fuselage panel 1 according to the invention is positioned so as to form the fuselage 32 of the aircraft 30 without, however, disturbing the aerodynamics of the aircraft 30.

A body panel 1, especially a fuselage 32 panel 1 of an aircraft 30 shown in FIG. 1, is mounted securely on the primary structure of the transport vehicle—especially an aircraft 30. Such a fuselage 32 panel 1 of an aircraft 30 has a main face 29 extending in contact with the external environment 5 of the aircraft 30. The fuselage 32 panel 1 comprises a supporting plate 2 fastened by means known per se to those skilled in the art—especially by screws and nuts—to the stringers and the longerons supporting the fuselage 32 of the aircraft 30. Such a fuselage panel 1 according to the invention has a heat exchange device 6 extending facing the external environment of the aircraft 30. Such a heat exchange device 6 in direct contact with the air of the external environment of the aircraft 30 has a favoured heat exchange. Furthermore, such a heat exchange device 6 in direct contact with the air of the external environment of the aircraft 30 allows drainage of leaks of heat transfer fluid to the outside of the aircraft 30. Maintenance of such a heat exchange device 6 is facilitated on account of the improved accessibility for maintenance personnel when the aircraft is on the ground.

A fuselage panel 1 according to the invention is shown in FIG. 2. The fuselage panel 1 has a supporting plate 2 adapted to be able to be fastened to the primary structure—especially to the stringers and/or the longerons—of an aircraft 30. The supporting plate 2 is fastened to the primary structure by conventional means for fastening a fuselage panel to the primary structure of an aircraft 30, for example by screws and nuts. The fuselage panel 1 for an aircraft has a smaller dimension, named thickness, extending in a first radial direction 50, and two larger dimensions extending in two directions perpendicular to one another and perpendicular to the radial direction 50.

The supporting plate 2 has a first main inner face 3 adapted to be able to be in contact with an inner space 15 of the aircraft 30 and a second face, named the outer face 4, opposite the inner face 3. The supporting plate 2 has an indentation 10 forming a housing adapted to receive the heat exchange device 6. The heat exchange device 6 positioned in the indentation 10 of the supporting plate 2 forms the outer surface of the fuselage panel 1 extending facing the external environment 5 of the aircraft 30 and so as not to reduce the aerodynamics of the aircraft 30.

The fuselage panel 1 may have a plurality of indentations 10. Each indentation 10 of the plurality of indentations 10 accommodates a heat exchange device 6 extending on the outer face 4 of the supporting plate 2 and in contact with the external environment 5 of the aircraft 30, each heat exchange device 6 being shaped to be able to allow a circulation of a heat transfer fluid 7 in a heat transfer fluid circuit 8 of the heat exchange device 6 between a heat transfer fluid 7 inlet 11 and a heat transfer fluid 7 outlet 12 and adapted to allow a dissipation of heat from the heat transfer fluid 7 to the external environment 5 of the aircraft 30.

The supporting plate 2 is a structure of the "sandwich" type comprising two rigid skins 34 or soles. These two rigid skins 34 may be formed of a composite material, for example an epoxy resin containing a glass fibre filler. The supporting plate 2 also comprises a honeycomb core 33 extending between the two rigid skins 34 and secured to the two rigid skins 34. By way of nonlimiting example, the honeycomb core 33 is formed of Nomex®.

The supporting plate 2 may also comprise an amount of a composite material extending in a porous space of the honeycomb core 33 adapted to reinforce the rigidity of the supporting plate 2.

The supporting plate 2 is in mechanical connection with at least one primary structure of the aircraft 30 by fastening members—especially of the screw/nut type. The supporting plate 2 is shaped so that the heat exchange device 6 follows the aerodynamic profile of the aircraft 30 and does not disturb it. In particular, the supporting plate 2 may be curved along two perpendicular axes so as to allow insertion of one or more heat exchange device(s) 6.

The fuselage panel 1 comprises a heat exchange device 6 adapted to allow a transfer of heat from a heat transfer fluid 7 circulating in the heat exchange device 6 to a cold fluid flowing outside the fuselage 32 of an aircraft 30. The heat exchange device 6 is formed of an aluminium alloy. By way of nonlimiting example, the heat transfer fluid 7 circulating in the heat exchange device 6 is a mixture of propylene/ethylene glycol and water in proportion by volume of 60/40.

A heat exchange device 6 according to the invention has the function of allowing a transfer of heat energy from a hot fluid to a cold fluid flowing outside of the transport vehicle—especially an aircraft 30. During this transfer of heat energy, the temperature of the hot fluid decreases and the temperature of the cold fluid increases. The hot fluid and the cold fluid are separated from one another by a wall made of aluminium alloy. By forced convection of the hot fluid in the heat transfer fluid circuit, the hot fluid transfers its heat energy to the wall made of aluminium alloy, which conducts the heat in its thickness. On the outer face of the heat exchange device 6, the heat energy is dissipated by forced convection on contact with the cold fluid when the transport vehicle is moving—especially when the aircraft is in flight—or by natural convection when the transport vehicle—especially the aircraft—is stationary.

In a fuselage panel 1 comprising a heat exchange device 6 according to the invention, the heat exchange device 6 extends on the outside of the fuselage 32 wall of the aircraft 30, secured to the supporting plate 2 forming the fuselage 32 of the aircraft 30, but without direct securing of the heat exchange device 6 to the primary structure of the aircraft 30. In a fuselage panel 1 comprising a heat exchange device 6 according to the invention, the stresses exerted by the external environment on the heat exchange device 6 are transmitted to the supporting plate 2 and not to the primary structure of the aircraft 30.

The heat exchange device 6 comprises a plurality of channels 19 extending between a heat transfer fluid 7 inlet into the heat exchange device 6 and a heat transfer fluid 7 outlet 12 from the heat exchange device 6 and adapted to allow a circulation of the heat transfer fluid 7 in the heat exchange device 6 between the heat transfer fluid 7 inlet 11 and the heat transfer fluid 7 outlet 12.

In a fuselage panel 1 shown in FIG. 2, the heat exchange device 6 comprises a plurality of channels 19 extending coplanar, substantially parallel to one another and parallel to the two main faces—inner face 3 and outer face 4—of the supporting plate 2. The channels 19 form a first series 36 of channels 19 adapted to allow a circulation of heat transfer fluid 7 in a first direction 40 between:

a heat transfer fluid 7 distribution member 38 in fluid communication with the heat transfer fluid 7 inlet 11, and;

an intermediate member 35 for collecting the heat transfer fluid 7 at the outlet of the channels 19 of the first series 36 of channels 19 and for distributing this heat transfer fluid 7 in the channels 19 of a second series 37 of channels 19 adapted to allow a circulation of heat transfer fluid 7 between the intermediate member for transferring the heat transfer fluid 7 and a collecting member 39 for collecting the cooled heat transfer fluid 7 in a second direction 41 substantially opposite the first direction 40 and in fluid communication with the heat transfer fluid 7 outlet 12 of the heat transfer fluid 7 circuit 8.

Thus, the heat transfer fluid 7 of the fluid circuit 8 enters the heat exchange device 6 through the fluid inlet 11, is distributed in the distribution member 38 among the channels 19 of the first series 36 of channels 19, flows in the channels 19 in which it is cooled, passes into the intermediate member 35 of the fluid circuit 8 in which it is guided so as to be able to flow in the channels 19 of the second series 37 of channels 19, in which it is further cooled, to the collecting member 39 and the heat transfer fluid 7 outlet 12 of the heat exchange device 6.

The main direction of extension of the channels 19 may extend substantially parallel to the flow direction of the external fluid and to the direction of movement of the transport vehicle—especially the aircraft 30. The heat transfer fluid 7 can flow in the channels 19 in the direction of normal movement of the transport vehicle—especially the aircraft 30. This is referred to as a "single-pass counterflow" heat exchange device 6. The heat transfer fluid 7 can flow in the channels 19 in the direction opposite the normal movement of the transport vehicle—especially the aircraft 30. This is referred to as a "single-pass parallel-flow" heat exchange device 6.

It is also possible that the main direction of extension of the channel 19 extends substantially perpendicularly to the direction of movement of the transport vehicle—especially the aircraft 30. This is referred to as a "single-pass crossflow" heat exchange device 6.

It is also possible that the heat exchange device 6 has three successive series of channels 19 forming a "U" in which the heat transfer fluid 7 flows alternately in a direction perpendicular—respectively parallel—then in a direction parallel—respectively perpendicular—then in a direction perpendicular—respectively parallel—to the direction of movement of the transport vehicle. This is referred to as a co-current or countercurrent "U-shaped" heat exchange device 6.

In a first variant of a fuselage panel 1 shown in FIG. 3, the heat exchange device 6—named a plate and tube device—is formed of extruded tubes 19 brazed to a rigid heat-conducting plate 20, having a first main face 21 extending facing the extruded brazed tubes 19 and a second main face opposite said first main face 21 and extending to the external environment 5 of the aircraft. In this first variant of a fuselage panel 1, the extruded tubes 19 of the heat exchange device 6 extend facing the supporting plate 2 and are protected from external attack by the heat-conducting plate 20. The extruded tubes 19 of the heat exchange device 6 according to this first variant of a fuselage panel 1 according to the invention has in transverse cross-section a substantially rectangle shape so that the thickness of the heat transfer fluid 7 in the fluid 7 circuit 8 is reduced and the efficiency of the heat energy transfer is improved. The extruded tubes 19 forming the heat transfer fluid 7 circuit 8 have a longitudinal axis substantially perpendicular to the flow of air moving along the outer wall of the fuselage 32 of the aircraft 30 in movement. The extruded tubes 19 are secured by brazing to the heat-conducting plate 20. The heat exchange body 6 of the fuselage panel 1 shown in FIG. 3 extends in the indentation 10 of a supporting plate 2 formed of a honeycomb core 33. In this first variant, the heat exchange device 6 extends outside the supporting plate 2 of the fuselage 32 of the aircraft 30.

In the embodiment of a fastening tie of FIG. 4, the heat exchange device 6 comprises:

- a first metal plate 26—especially made of aluminium alloy—extending facing the outer face 4 of the supporting plate 2 of the aircraft, and;
- a second metal plate 27—especially made of aluminium alloy—forming the heat exchange device 6 with the first metal plate 26, and;
- extending securely between the first metal plate 26 and the second metal plate 27, an interlay part 28 adapted to be able to maintain the first metal plate 26 and the second metal plate 27 spaced apart with respect to one another and to allow a circulation of the heat transfer fluid 7 in channels of the heat exchange device 6 between a heat transfer fluid 7 inlet and a heat transfer fluid 7 outlet, and;
- at least one eyelet for receiving the flared head of a fastening tie 14, said eyelet comprising a ring 47 for centring the fastening tie 14 in the eyelet and a peripheral seal 16 of the heat exchange device 6.

In the embodiment of FIG. 4, the supporting plate 2 comprises:

- two rigid skins 34 extending securely on the two main faces of a honeycomb core 33, and
- a through hole 55 for receiving the fastening tie 9 formed in the thickness of the core 33 and the skins 34 of the supporting plate 2 and opening out on the two main faces of the latter.

The fastening tie 9 of FIG. 4 comprises a radial clamping bolt 14 comprising a shank and a nut 17, a tangential friction washer 44 interposed between the first plate 26 of the heat exchange device 6 and the skin 34 extending on the outer face 4 of the supporting plate 2. The fastening tie 9 also comprises a tangential friction washer 43 interposed between a set of washers 13 for elastic return in axial compression mounted in series and the inner face 3 of the supporting plate 2. The fastening tie 9 comprises a compression shim 46 for compressing the set of washers 13, which is held and clamped on the shank of the bolt by a nut (optionally comprising a locking pin). The compression shim 46 has at an inner end a collar receiving the nut 17 and compressing the elastic washers 13. The shim 46 has a through bore for the passage of the threaded end of the shank of the bolt 14 of lesser diameter. This shank has a shoulder 53 projecting radially with respect to this threaded end. The end of the shim 46 opposite the collar comes into abutment against the shoulder of the shank of the bolt 14. Consequently, regardless of the tightening torque of the nut 17, the position of the collar of the shim 46 is predetermined when the shim 46 is in abutment on the shoulder 53 of the shank. This position of the collar of the shim 46 determines, after tightening of the nut 17, with the thickness of the tangential friction washer 43, the axial height receiving the elastic washers.

The axial prestress exerted by the bolt 14 therefore depends on the height at rest of the set of elastic washers 13, the stiffness of this set of elastic washers 13 and the axial height defined by the compression shim 46 (which imposes a predetermined deformation of the elastic washers). Thus, the value of said axial clamping prestress is determined by adjustment of the crushing of the elastic washers 13, which only depends on the height of the compression shim 46 and does not depend on the tightening torque of the nut 17.

A radial clearance is formed between the shank of the bolt 14 and the inner wall of the hole 55. The inner tangential friction inner washer 43 is secured in tangential translation to the shank of the rod 14 via the shim 46 which passes through the washer 43 with a minimum clearance. Consequently, any relative movement of the skin 34 with respect to the shank of the bolt 14 takes place by friction between the tangential friction washer 43 and the skin 34. This possibility of tangential movement therefore depends on the static friction imparted on contact of this friction washer 43 and the skin 34, the value of which is defined by the axial compression prestress and by the coefficient of static friction of this contact.

The outer tangential friction washer 44 is also secured in tangential translation to the shank of the bolt 14 and to the first plate 26 of the heat exchange device 6. This washer 44 by contrast can move tangentially with respect to the outer skin 34 of the supporting plate 2 with which it is in contact. The possibility of tangential movement of the heat exchange device 6 with respect to the supporting plate 2 therefore also depends on the static friction imparted on contact between the outer tangential friction washer 44 and the skin 34, the value of which is defined by the axial compression prestress imparted by the bolt 14 and the elastic washers 13 at this contact, the ring 47 applying the washer 44 against the skin 34. The value of the prestress also depends on the coefficient of static friction of this contact (materials, surface states . . . ).

In the embodiment of the fastening tie 9 shown in FIG. 5, the supporting plate 2 has a blind tube 56 embedded by bonding in the honeycomb core 33, said tube 56 having a threaded blind bore for receiving a radial clamping screw 64 with a countersunk head. The fastening tie 9 shown in FIG. 5 also comprises a compression shim 57 having a bore through which the screw 64 passes, and on which the countersunk head of the screw 64 bears. The shim 57 itself bears on a set of elastic washers 13 in axial compression.

The plates 26, 27 of the heat exchange device 6 have an aperture of large dimension for the passage of the fastening tie 9. A ring 65 is inserted in this aperture to form a counterbore for receiving the head of the screw 64 and elastic washers 13 in compression. This ring 65 is covered on each side by two washers 66, 67, to which it is secured by means of screws 68. A first tangential friction inner washer 66 is in contact with the core 33 of the supporting plate 2. This inner washer 66 constitutes a tangential friction washer. The outer washer 67 serves as a support for the elastic washers 13. The screw 64 and the shim 57 pass through the ring 65 and the two washers 66, 67 while forming a radial clearance allowing the movement of the ring 65 (by friction of the washer 66 on the core 33) with respect to the screw 64 and to the shim 57, themselves secured to the core 33 via the clamping tube 56 mounted without clearance in the core 33.

The shim 57 is moreover in axial abutment against the tube when the screw 64 is tightened. The height provided between the face of the shim 57 bearing on the elastic washers 13 and the outer washer 67, after tightening of the screw 64 in the tube 56, determines the deformation in axial compression of the elastic washers 13, and thus the value of the elastic clamping prestress in compression imparted between the tangential friction washer 66 and the core 33.

The dimensions of the compression shim 57 are suitable for obtaining—in combination with the dimensions of the clamping screw 14, of the set of elastic washers 13 and with the stiffness of these elastic washers—a suitable value of said elastic prestress in compression. The counterbore for receiving the countersunk head of the screw 14 is preferably closed by a cover ensuring the continuity of the external shape of the heat exchange device 6.

In the embodiment of the fastening tie 9 shown in FIG. 6, the supporting plate 2 comprises an insert 42 having a through bore opening out on the two main faces 3, 4 of said supporting plate 2. The insert 42 forms an inner aperture 48 for receiving the removable radial clamping bolt 14 and an inner collar 70 and outer collar 71 covering the outer faces 3, 4 of the supporting plate 2.

The heat exchange device 6 comprises a circular seal 51 of the eyelet for fastening the heat exchange device 6 on the supporting plate 2, said seal extending between two aluminium alloy sheets and being adapted to allow the passage of the clamping bolt 14 and to ensure the sealing of the heat transfer fluid circuit. The heat exchange device 6 also comprises a ring 47 for mounting and centring the head of the bolt 14. The tangential friction washers 43 and 44 are adapted to allow a relative tangential movement of the heat exchange device 6 at the surface of the supporting plate 2 under the effect of the differential expansions of the heat exchange device 6 and the supporting plate 2. The tangential friction outer washer 44 is interposed between the seal 51 secured to the heat exchange device 6 and an outer tangential face of the outer collar 71 of the insert 42 secured to the supporting plate 2. The countersunk head of the screw of the bolt 14 passes through the tangential friction outer washer 44 without radial clearance. Said washer is therefore secured to this screw in its tangential movements, and can move by friction against the outer collar 71 of the supporting plate 2, according to the static friction value imparted on this contact.

The bolt 14 comprises a shank passing through the aperture with a radial clearance, and a threaded inner end receiving a nut 17, a clamping washer 52 and a compression washer 46 in axial abutment against a radial shoulder 53 of the screw of the bolt 14. A set of elastic washers 13 in axial compression mounted in opposite directions are placed between the compression shim 46 and the tangential friction inner washer 43. This tangential friction washer 43 is in contact with the inner face of the inner collar 70 of the insert 42. Furthermore, it has passing through it without radial clearance the screw of the bolt 14 and is therefore secured to the latter in its tangential movements. The functioning of this embodiment is therefore similar to that of FIG. 4 except that the tangential faces in contact with the friction washers 43, 44 are those of the collars 70, 71 of the insert 42 instead of the skins 34 of the supporting plate 2.

In the embodiment of the fastening tie 9 shown in FIG. 7, the fastening tie 9 comprises a ball joint 58, 59 interposed between the insert 42 of the supporting plate 2 and the clamping nut 17. The insert 42 is fastened by bonding 60 to the supporting plate 2. The tangential friction outer washer 44 is again in contact with the outer face of the outer collar 71 of the insert 42. The ball joint 58, 59 is adapted to allow a pivoting of the clamping bolt 14 upon the relative tangential movement of the heat exchange device 6 and the supporting plate 2 by friction against the tangential friction outer washer 44.

In this embodiment, the axial compression prestress applying the tangential friction washer 44 on the collar 71 of the insert 42 is adjusted by the tightening torque of the nut 17 on the shank of the bolt 14 and depends on the elasticity in axial compression of the ball joint 58, 59. The ball joint 58, 59 is formed by a cup 59 in contact with the inner collar 70 of the insert 42, and a spherical cap 58 received in the cup 59. The spherical cap 58 may have an elasticity in axial compression to adjust said prestress. Preferably, the static friction between the cup 59 and the inner collar 70 of the insert 42 is greater than that between the tangential friction washer 44 and the outer collar 71 of the insert 42. Thus, when the tangential forces due to differential thermal expansions exceed the static friction of the tangential friction washer 44, the latter can move tangentially by sliding on the outer collar due to the radial clearance between the shank of the bolt 14 and the insert 42, but the cup 59 of the ball joint remains in place relative to the inner collar 70.

In another embodiment (not shown), the fastening device comprises at least one elastic clamping tie formed of a cable tensioned in traction between the heat exchange device and the supporting plate so as to apply the tangential faces of the heat exchange device and of the supporting plate so as to bear on one another with an elastic prestress in compression (the value of which depends on the elastic return force exerted by the cable tensioned in traction). The cable passes longitudinally through in an insert of the supporting plate. One of the longitudinal ends of the cable has a plate secured—especially by rivets—to the heat exchange device, the other of the longitudinal ends being crimped securely on the inner face of insert. The bending flexibility of the cable is adapted to allow the tangential movement of the heat exchange device on the supporting plate. Its tension and its longitudinal elasticity in traction guarantee the permanent contact of the heat exchange device and the supporting plate and the application of an elastic prestress in compression with a value predetermined and adapted to produce an appropriate static friction value of the heat exchange device on the supporting plate.

In all the embodiments shown, the fastening tie 9 is adapted to be able to fasten the heat exchange device 6 to the supporting plate 2 while allowing a relative tangential movement by controlling the tangential static friction between these parts. Said axial compression prestress determining the static friction can be obtained by suitable dimensioning of the radial clamping bolt 14, the tangential friction washers 43, 44, the insert 42, the member 13 for elastic return in axial compression, the compression shim 46 and the stop 53 for receiving the shim 46 and by the stiffness of the elastic return member 13. The value of the prestress is adjusted by the initial deformation imparted to the elastic members exerting this prestress.

In a fastening tie 9 according to the invention, the radial clamping bolt 14 is an anchor 14 which may be made of aluminium, the insert 42 of the supporting plate 2 may be made of steel, the tangential friction washers 43, 44 may be made of steel coated with Teflon or grease and the member 13 for elastic return in axial compression of the compression shim 46 may be a washer or stack of spring washers or "Belleville" washers made of steel mounted in series or in opposite directions. The elastic prestress can be exerted in whole or in part by other elastic return members (elastic block in compression, spring . . . ) and/or by the shank of the bolt 14. The tangential friction washers 43, 44 are the only wear parts.

In a second variant (not shown) of a fuselage panel according to the invention, the heat exchange device—named a "plate and plate" device—is formed by two aluminium alloy sheets welded to one another by diffusion. Such a heat exchange device of the "plate and plate" type is manufactured by depositing a diffusion welding inhibitor on the areas of one of the two aluminium sheets intended for forming the channels for conveying the heat transfer fluid. In a subsequent step of welding the two sheets at the areas without welding inhibitor, the conveying channels of the heat transfer fluid circuit are formed. The application of a high pressure between the two aluminium sheets allows the opening of tubes suitable for receiving the heat transfer fluid of a heat transfer fluid circuit. Such a heat exchange device is formed by a first plate adapted to extend facing the external space of the aircraft and allow a heat exchange with the atmosphere and a second plate extending facing the supporting plate. Such a heat exchange device further comprises:
  at least one member for distributing heat transfer fluid in the tubes, said distribution member being in fluid communication with the heat transfer fluid inlet of the heat exchange device, and;
  at least one member for collecting heat transfer fluid cooled in the heat exchange device and in fluid communication with the heat transfer fluid outlet of the heat transfer fluid circuit.

A heat exchange device according to the second variant may also comprise an intermediate member for collecting the heat transfer fluid at the outlet of the tubes of a first series of tubes and for distributing this heat transfer fluid in the tubes of a second series of tubes.

In a third variant (not shown) of a fuselage panel according to the invention, the heat exchange device may be formed of a single tube bent into a coil extending between the heat transfer fluid inlet and the heat transfer fluid outlet and in which the heat transfer fluid flows. In this third variant, the heat exchange device has no intermediate member and/or distribution member and/or collecting member.

In a fourth variant (not shown) of a fuselage panel according to the invention, the heat exchange device—named a "plate and interlay" device—is formed of two sheets or plates of aluminium alloy welded facing one another on the two main faces of a spacing interlay part for spacing the two sheets of aluminium alloy. The spacing interlay part may be of any shape, in particular of undulating shape having in transverse cross-section a substantially sinusoidal shape or square-wave shape. The spacing interlay part may have in longitudinal cross-section a sinusoidal shape or a square-wave form or other shape. Such a spacing interlay part allows an improvement of the heat transfer and limits the deformation of the aluminium alloy sheets exposed to the heat transfer fluid circulating under pressure.

A heat exchange device according to this fourth variant of the invention further comprises a peripheral seal extending between the two aluminium alloy sheets adapted to maintain a circulation of heat transfer fluid between the aluminium alloy sheets or plates. A heat exchange device according to this fourth variant of the invention also comprises at least one eyelet passing through said heat exchange device and adapted to receive a bolt—especially an anchor—for radial clamping of the heat exchange device on the supporting plate.

Of course, this description is given as an illustrative example only and those skilled in the art will be able to provide numerous modifications, variations and applications without departing from the scope of the invention, such as for example the constituent materials of the heat exchange device and of the supporting plate, the dimensions and shapes of the fastening device and of the body panel.

The invention claimed is:

1. Body panel (1) for a transport vehicle comprising a heat exchange device (6), said body panel (1) having a smaller dimension, named the thickness, extending in a first direction, named the radial direction (50), and two larger dimensions extending in two directions perpendicular to one another and perpendicular to the radial direction (50),
  said panel (1) comprising a supporting plate (2) having a first main face, named the inner face (3), intended to be in contact with an internal space (15) of the transport vehicle and a second face, named the outer face (4), opposite said inner face (3); the heat exchange device (6) is fastened to the supporting plate (2) by a fastening device (9) and extends on said outer face (4) of the supporting plate (2) and so as to extend in contact with an external environment (5) of the transport vehicle, said heat exchange device (6) being shaped to allow a circulation of a heat transfer fluid (7) in a heat transfer fluid circuit (8) comprising the heat exchange device (6) between at least one heat transfer fluid inlet (11) of the heat exchange device (6) and at least one heat transfer fluid (7) outlet (12) of the heat exchange device (6) and to allow a dissipation of heat of the heat transfer fluid (7) to the external environment (5) of the transport vehicle;
  wherein the supporting plate (2) forms, on its outer face (4), an indentation (10) extending in the thickness of the supporting plate (2), said indentation (10) being adapted to receive the heat exchange device (6) and so that the heat exchange device (6) does not extend beyond the general profile of the body of the transport vehicle.

2. Panel (1) as claimed in claim 1, wherein the supporting plate (2) is formed of a composite material comprising a honeycomb core (33) extending between two rigid skins (34).

3. Panel (1) as claimed in claim 2, wherein the supporting plate (2) comprises at least one fastening member (9) for fastening the supporting plate (2) to a primary structure of the transport vehicle.

4. Panel (1) as claimed in claim 2, wherein the supporting plate (2) has at least one orifice (45) for the passage of at least one conduit of the heat transfer fluid (7) circuit (8) through the supporting plate (2), said conduit being adapted to be able to put in fluid communication the heat transfer fluid (7) inlet (11) and the heat transfer fluid (7) outlet (12) of the heat exchange device (6) with the heat transfer fluid circuit (8).

5. Panel (1) as claimed in claim 2, wherein the heat exchange device (6) comprises:
- at least one channel (19) in heat transfer fluid (7) communication with the heat transfer fluid circuit (8) of an aircraft (30) and extending between the fluid inlet (11) and the fluid outlet (12), each channel (19) having a polygonal shape in transverse cross-section, and;
- a heat-conducting plate (20) extending secured and in contact with the channels (19) on a first main face (21) and in contact with the external environment (5) of the aircraft (30) on a second main face (22) opposite said first main face (21).

6. Panel (1) as claimed in claim 1, wherein the supporting plate (2) comprises at least one fastening member (9) for fastening the supporting plate (2) to a primary structure of the transport vehicle.

7. Panel (1) as claimed in claim 6, wherein the supporting plate (2) has at least one orifice (45) for the passage of at least one conduit of the heat transfer fluid (7) circuit (8) through the supporting plate (2), said conduit being adapted to be able to put in fluid communication the heat transfer fluid (7) inlet (11) and the heat transfer fluid (7) outlet (12) of the heat exchange device (6) with the heat transfer fluid circuit (8).

8. Panel (1) as claimed in claim 6, wherein the heat exchange device (6) comprises:
- at least one channel (19) in heat transfer fluid (7) communication with the heat transfer fluid circuit (8) of an aircraft (30) and extending between the fluid inlet (11) and the fluid outlet (12), each channel (19) having a polygonal shape in transverse cross-section, and;
- a heat-conducting plate (20) extending secured and in contact with the channels (19) on a first main face (21) and in contact with the external environment (5) of the aircraft (30) on a second main face (22) opposite said first main face (21).

9. Panel (1) as claimed in claim 1, wherein the supporting plate (2) has at least one orifice (45) for the passage of at least one conduit of the heat transfer fluid (7) circuit (8) through the supporting plate (2), said conduit being adapted to be able to put in fluid communication the heat transfer fluid (7) inlet (11) and the heat transfer fluid (7) outlet (12) of the heat exchange device (6) with the heat transfer fluid circuit (8).

10. Panel (1) as claimed in claim 9, wherein the heat exchange device (6) comprises:
- at least one channel (19) in heat transfer fluid (7) communication with the heat transfer fluid circuit (8) of an aircraft (30) and extending between the fluid inlet (11) and the fluid outlet (12), each channel (19) having a polygonal shape in transverse cross-section, and;
- a heat-conducting plate (20) extending secured and in contact with the channels (19) on a first main face (21) and in contact with the external environment (5) of the aircraft (30) on a second main face (22) opposite said first main face (21).

11. Panel (1) as claimed in claim 1, wherein the heat exchange device (6) comprises:
- at least one channel (19) in heat transfer fluid (7) communication with the heat transfer fluid circuit (8) of an aircraft (30) and extending between the fluid inlet (11) and the fluid outlet (12), each channel (19) having a polygonal shape in transverse cross-section, and;
- a heat-conducting plate (20) extending secured and in contact with the channels (19) on a first main face (21) and in contact with the external environment (5) of the aircraft (30) on a second main face (22) opposite said first main face (21).

12. Panel (1) as claimed in claim 11, wherein the heat-conducting plate (20) is formed of a material chosen from the group formed of aluminium alloys.

13. Panel (1) as claimed in claim 11, wherein the heat-conducting plate (20) is secured to longitudinal walls of the channel(s) (19) by brazing.

14. Panel (1) as claimed in claim 1, wherein the heat exchange device (6) comprises:
- a corrugated metal plate, named the inner metal plate, adapted to be able to extend facing the outer face (4) of the supporting plate (2), and;
- a substantially plane outer metal plate adapted to be able to extend in contact with the external environment (5) of the aircraft (30);

said inner and outer metal plates being connected to one another by brazing so as to form a plurality of channels (19) in heat transfer fluid (7) communication with the heat transfer fluid (7) circuit (8) of the aircraft (30) and extending between the heat transfer fluid (7) inlet (11) and the heat transfer fluid (7) outlet (12).

15. Panel (1) as claimed in claim 1, wherein the heat exchange device (6) comprises:
- a first metal plate (26) adapted to be able to extend facing the outer face (4) of the supporting plate (2);
- a second metal plate (27), and;
- extending secured between the first metal plate (26) and the second metal plate (27), an interlay part (28) adapted to be able to keep the first metal plate (26) and the second metal plate (27) spaced with respect to one another and to allow a circulation of the heat transfer fluid (7) between the heat transfer fluid (7) inlet (11) and the heat transfer fluid (7) outlet (12).

16. Panel (1) as claimed in claim 1, wherein it has a main face (29) extending in contact with the external environment (5) of the aircraft (30) of rounded convex shape and having in section in at least one radial plane —especially in each of the radial planes—comprising the radial direction (50) of the fuselage panel (1) a curvature adapted to preserve the aerodynamic behaviour of the aircraft (30).

17. Panel (1) as claimed in claim 1, wherein the fastening device (9) for fastening the heat exchange device (6) to the supporting plate (2) comprises fastening ties distributed at the surface of the heat exchange device and holding the heat exchange device rigidly with respect to the supporting plate.

18. Panel (1) as claimed in claim 17, wherein each fastening tie (9) comprises:
- a tangential clearance allowing relative movements of the heat exchange device (6) with respect to the supporting plate (2) in a tangential direction perpendicular to said radial direction,
- a radial clamping device (14) applying at least one tangential face secured to the heat exchange device (6) and at least one tangential face secured to the supporting plate (2) to bear on one another with a prestress in compression chosen so as to produce a static friction of the heat exchange device (6) on the supporting plate (2):
  - sufficient to keep in operation the heat exchange device (6) fixed with respect to the supporting plate (2),
  - allowing the tangential relative movements of the heat exchange device (6) with respect to the supporting plate (2) by virtue of the tangential clearance under the effect of the differential thermal expansions between the heat exchange device (6) and the supporting plate (2).

19. Transport vehicle comprising a panel (1) as claimed in claim 1.

* * * * *